US012387551B2

(12) United States Patent
Baker et al.

(10) Patent No.: US 12,387,551 B2
(45) Date of Patent: Aug. 12, 2025

(54) SYSTEM AND METHOD FOR STREAMING WAGERING GAMES

(71) Applicant: IGT, Las Vegas, NV (US)

(72) Inventors: Curtis Baker, Reno, NV (US); Kevin Higgins, Reno, NV (US); Dwayne R. Nelson, Las Vegas, NV (US)

(73) Assignee: IGT, Las Vegas, NV (US)

(*) Notice: Subject to any disclaimer, the term of this patent is extended or adjusted under 35 U.S.C. 154(b) by 0 days.

(21) Appl. No.: 18/502,706

(22) Filed: Nov. 6, 2023

(65) Prior Publication Data

US 2024/0071165 A1 Feb. 29, 2024

Related U.S. Application Data

(63) Continuation of application No. 17/201,333, filed on Mar. 15, 2021, now Pat. No. 11,842,599, which is a continuation of application No. 16/356,510, filed on Mar. 18, 2019, now Pat. No. 10,950,081.

(51) Int. Cl.
*G07F 17/32* (2006.01)

(52) U.S. Cl.
CPC ...... *G07F 17/3211* (2013.01); *G07F 17/3209* (2013.01); *G07F 17/3223* (2013.01); *G07F 17/3244* (2013.01); *G07F 17/3276* (2013.01)

(58) Field of Classification Search
CPC ............. G07F 17/3211; G07F 17/3244; G07F 17/3276; G07F 17/3209; G07F 17/3223
See application file for complete search history.

(56) References Cited

U.S. PATENT DOCUMENTS

| | | | |
|---|---|---|---|
| 7,156,741 | B2 | 1/2007 | Hornik et al. |
| 8,262,468 | B1 | 9/2012 | Vanbragt et al. |
| 8,690,684 | B2 | 4/2014 | Vanbragt et al. |
| 8,727,892 | B1 | 5/2014 | Chun |
| 9,401,065 | B2 | 7/2016 | Lemay et al. |
| 9,466,173 | B2 | 10/2016 | Nelson et al. |
| 9,597,586 | B1 | 3/2017 | Wiklem et al. |
| 9,604,132 | B1 | 3/2017 | Wiklem et al. |
| 9,715,789 | B1 | 7/2017 | Kane et al. |
| 10,105,596 | B1 | 10/2018 | Mann |
| 10,950,081 | B2 | 3/2021 | Baker et al. |
| 2003/0100375 | A1 | 5/2003 | Wakae et al. |
| 2008/0058049 | A1 | 3/2008 | Lutnick et al. |
| 2008/0274798 | A1 | 11/2008 | Walker et al. |
| 2012/0094737 | A1 | 4/2012 | Barclay et al. |
| 2013/0281188 | A1 | 10/2013 | Guinn et al. |
| 2014/0038141 | A1 | 2/2014 | Burza et al. |

(Continued)

OTHER PUBLICATIONS

"Twitch Cheering will sell you Bits you can use for your favorite streams" by Shane McGlaun published to https://www.slashgear.com/twitch-cheering-will-sell-you-bits-you-can-use-for-your-favorite-streams-28446163/ on Jun. 28, 2016 (Year: 2016).*

(Continued)

*Primary Examiner* — Peter J Iannuzzi
(74) *Attorney, Agent, or Firm* — Neal, Gerber & Eisenberg LLP

(57) ABSTRACT

Systems and methods that utilize an electronic gaming machine to stream one or more events occurring in association with the electronic gaming machine to zero, one or more interested parties whom are remote from the electronic gaming machine.

20 Claims, 9 Drawing Sheets

(56) References Cited

U.S. PATENT DOCUMENTS

| | | | |
|---|---|---|---|
| 2014/0274359 A1 | 9/2014 | Helava et al. | |
| 2015/0072786 A1 | 3/2015 | Perry et al. | |
| 2015/0335999 A1 | 11/2015 | Shimizu et al. | |
| 2016/0166939 A9 | 6/2016 | Chudley et al. | |
| 2017/0006322 A1 | 1/2017 | Dury et al. | |
| 2017/0358176 A1* | 12/2017 | Carpenter | G06F 9/4406 |
| 2020/0066093 A1* | 2/2020 | Schwartz | G07F 17/3206 |

OTHER PUBLICATIONS

"On-screen Privacy with steam-overlay while on twitch" published to https://steamcommunity.com/discussions/forum/10/215439774850283205/ by CatSocietySempai on Nov. 16, 2016 (Year: 2016).*

"Overwatch Seagull as RoadHog Jun. 20, 2016 Streaming #01" published by CrazyWolfxx to YouTube at (https://www.youtube.com/watch?v=1lJrx3Zs3hQ) on Jun. 20, 2016 (Year: 2016).

"Twitch Cheering will sell you Bits you can use for your favorite streams" , "Twitch Cheering will sell you Bits you can use for your favorite streams" by Shane McGlaun published to https://www.slashgear.com/twitch-cheering-will-sell-you-bits-you-can-use-for-your-favorite-streams-28446163/ on Jun. 28, 2016. (Year: 2016).

* cited by examiner

SYSTEM AND METHOD FOR STREAMING WAGERING GAMES

PRIORITY CLAIM

This application is a continuation of, claims the benefit of and priority to U.S. patent application Ser. No. 17/201,333, filed on Mar. 15, 2021, which is a continuation of, claims the benefit of and priority to U.S. patent application Ser. No. 16/356,510, filed on Mar. 18, 2019, the entire contents of which are each incorporated by reference herein.

BACKGROUND

Gaming machines may provide players awards in primary games. Gaming machines generally require the player to place a wager to activate the primary game. The award may be based on the player obtaining a winning symbol or symbol combination and on the amount of the wager.

BRIEF SUMMARY

In certain embodiments, the present disclosure relates to an electronic gaming machine including a display device, a processor, and a memory device that stores a plurality of instructions. When executed by the processor upon an occurrence of a game triggering event, the instructions cause the processor to cause the display device to display a play of a wagering game and communicate data associated with the play of the wagering game to a live streaming platform server. When executed by the processor upon an occurrence of a remote viewer interaction event occurring in association with a live stream that is based on the communicated data associated with the play of the wagering game and accessible by a remote viewer at a remote device, the instructions cause the processor to enable a player to interact with the remote viewer.

In certain embodiments, the present disclosure relates to a live streaming platform server including a processor, and a memory device that stores a plurality of instructions. When executed by the processor, the instructions cause the processor to receive, from an electronic gaming machine, data associated with a wagering gaming session occurring at the electronic gaming machine, determine a live stream based on the received data, and broadcast the determined live stream to a plurality of remote viewers at a plurality of devices. When executed by the processor responsive to an occurrence of a remote viewer wagering event, the instructions cause the processor to transfer funds from a live streaming platform account associated with one of the remote viewers to a cashless wagering account associated with that remote viewer.

In certain embodiments, the present disclosure relates to a method of operating an electronic gaming machine, the method including upon an occurrence of a game triggering event, displaying, by a display device, a play of a wagering game, and communicating data associated with the play of the wagering game to a live streaming platform server. Upon an occurrence of a remote viewer interaction event occurring in association with a live stream that is based on the communicated data associated with the play of the wagering game and accessible by a remote viewer at a remote device, the method includes enabling a player to interact with the remote viewer.

Additional features are described herein, and will be apparent from the following Detailed Description and the figures.

DETAILED DESCRIPTION

In various embodiments, the systems and methods disclosed herein utilizes an electronic gaming machine ("EGM") to stream one or more events occurring in association with the EGM to zero, one or more interested parties whom are remote from the EGM.

In certain embodiments, the system enables a player at an EGM to participate in a live stream of their gaming experience wherein the EGM generates and captures live stream data, such as wagers placed, audio/visual content of the plays of the games at the EGM, statistics regarding such plays and/or the player's reaction to the plays of the games. In these embodiments, the EGM uploads the captured live stream data to a live streaming platform, such as a live streaming server, which enables, following any modifications to the captured live streaming data, zero, one or more remote viewers to view the captured live stream. In certain embodiments, the EGM further enables the player to modify how they are presented to the remote viewers as well as interact with the remote viewers (such as via peripheral devices including a camera and/or microphone).

In certain embodiments, the system enables the remote viewers to not only view the live stream (for free or a fee), but interact with the player at the EGM via sending the player at the EGM messages and/or gifts. In certain embodiments, the system additionally or alternatively enables the remote viewer to place one or more wagers on the events occurring in association with the live stream. In these embodiments, since the live stream is originated from the EGM, upon the remote viewer interacting with the EGM via the live streaming platform, the live streaming platform notifies the EGM of the interaction such that the EGM informs the player and/or modifies the generated live stream data if necessary. Such a configuration thus provides an increased level of interaction between players at EGMs and remote viewers whom are interested in viewing one or more events occurring at such EGMs.

Figure 1A:
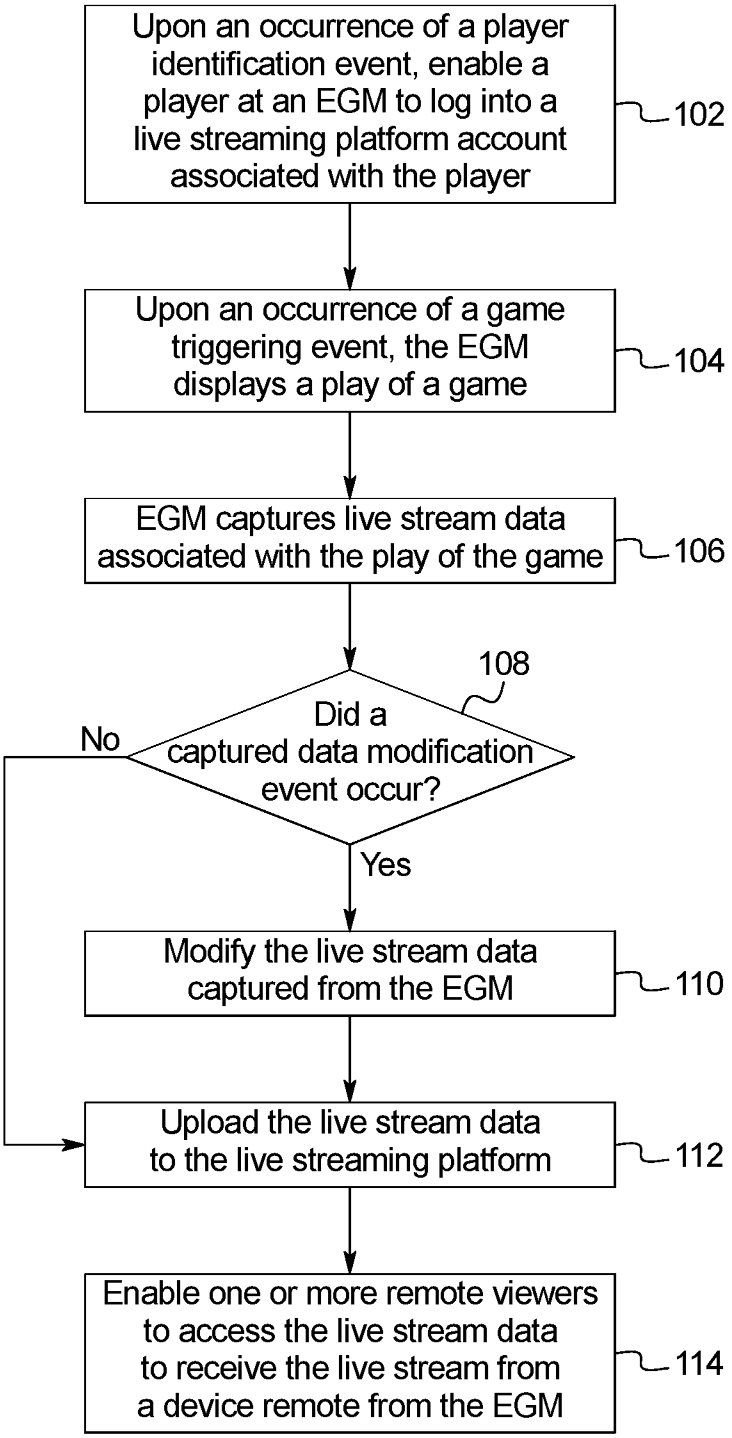
FIG. 1A is a flow chart of an example process for operating a system which streams one or more events occurring at an electronic gaming machine to one or more remote viewers.
Figure 1B:
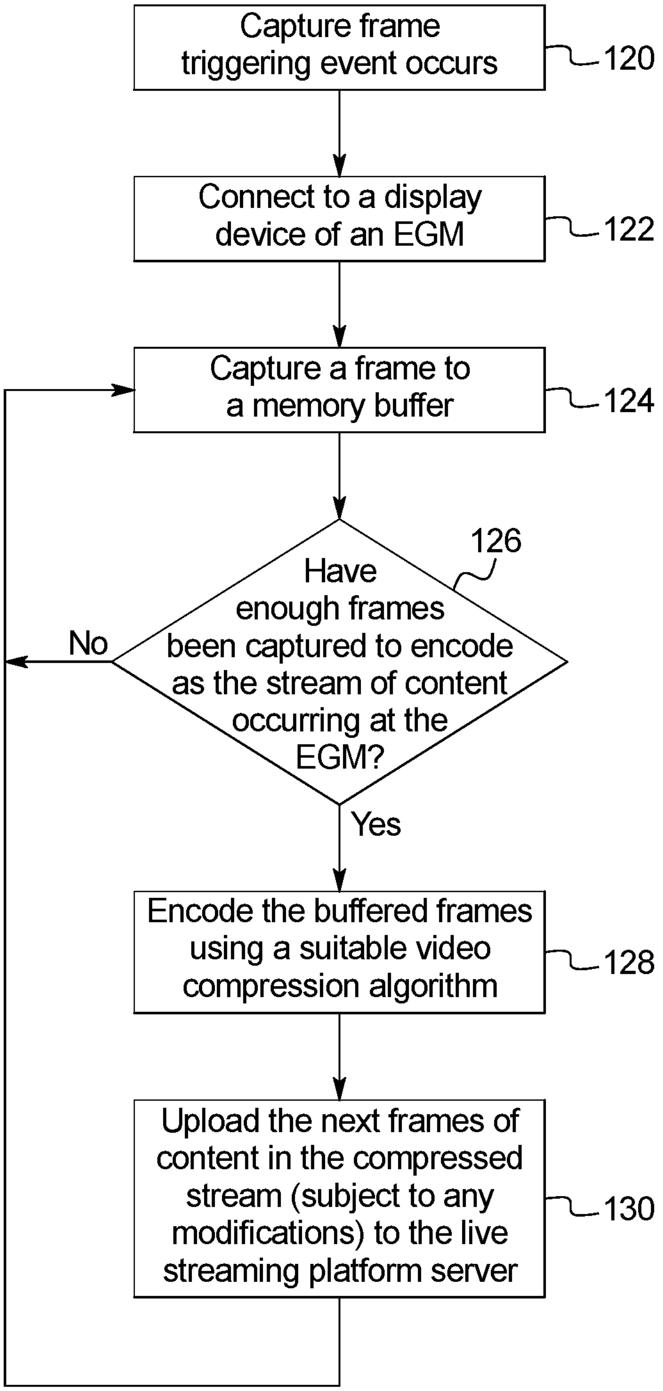
FIG. 1B is a flow chart of an example process for capturing content of a display device of an electronic gaming machine.
Figure 1C:
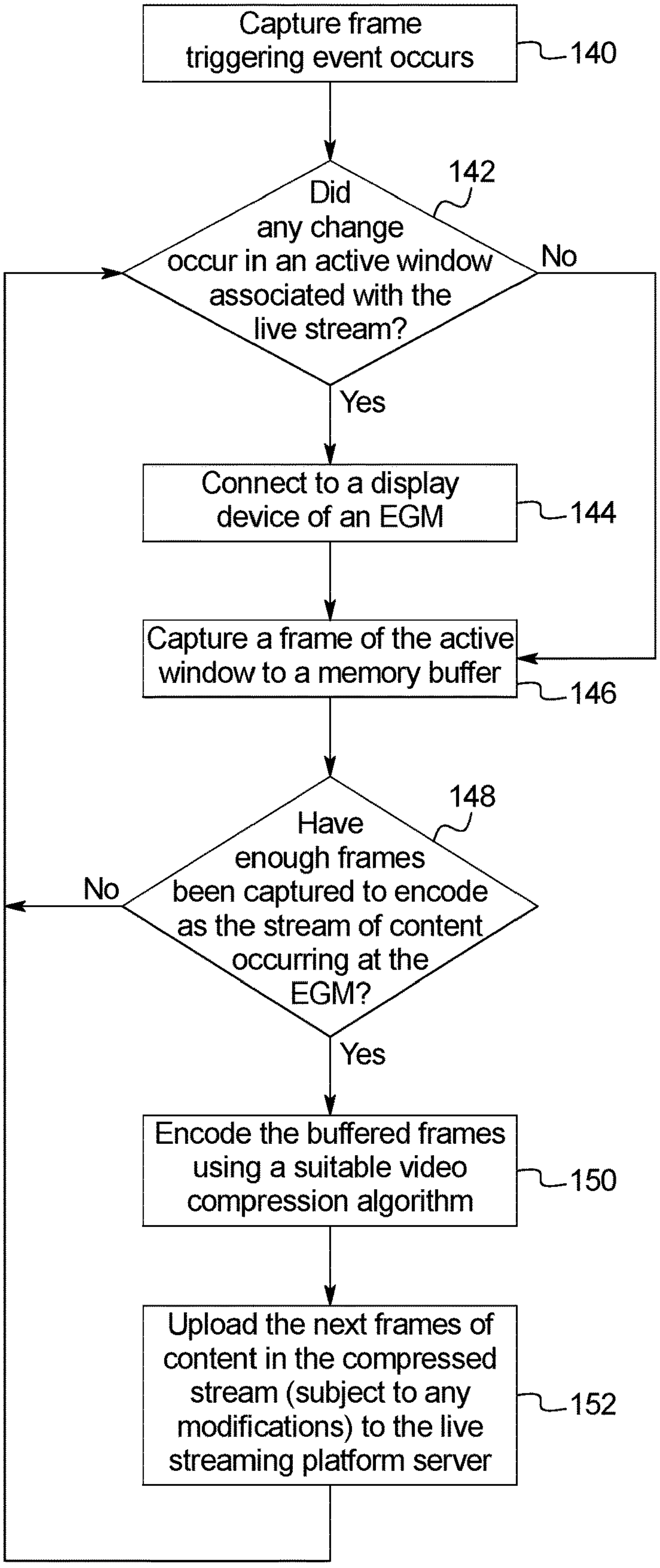
FIG. 1C is a flow chart of an example process for capturing content of an active window of a display device of an electronic gaming machine.

FIGS. 1A to 1C are flowcharts of example processes or methods of operating the system of the present disclosure. In various embodiments, the processes are represented by a set of instructions stored in one or more memories and executed by one or more processors. Although the processes are described with reference to the flowchart shown in FIGS. 1A to 1C, many other processes of performing the acts associated with these illustrated processes may be employed. For example, the order of certain of the illustrated blocks or diamonds may be changed, certain of the illustrated blocks or diamonds may be optional, or certain of the illustrated blocks or diamonds may not be employed.

In certain embodiments, upon an occurrence of a player identification event, as indicated by block 102 of FIG. 1A, the system enables a player at an EGM to log into a live streaming platform account associated with the player. In certain embodiments, with reference to FIG. 2, wherein the system includes or is otherwise in communication with a gaming establishment player tracking system 202 of a gaming establishment customer management system 204, the player identification occurs in association with a player logging into the player tracking system from an EGM 206 and the EGM communicating player identification data to one or more live streaming platform servers which log the player into the live streaming account associated with the player 208. In certain embodiments wherein the system is separate from and not in communication with a gaming establishment player tracking system, the player identification occurs in association with a player logging into the live streaming platform from an EGM (such as by the player entering an identification and password or login code at the EGM) and the EGM communicating player identification data to one or more live streaming platform servers which log the player into the live streaming account associated with the player. In these embodiments, the player logs into a live streaming platform account via one or more of: the player inserting a live streaming platform identification card (that has an encoded player identification number that uniquely identifies the player) into a card reader of an EGM; the player inserting a player tracking card that functions as a live streaming platform identification card (that has an encoded player identification number that uniquely identifies the player) into a card reader of an EGM; an establishment of a wireless communication link between an EGM and a mobile device executing an application associated with an identified player; the utilization of any suitable biometric technology or ticket technology to identify a player associated with a gaming session occurring at an EGM.

It should be appreciated that the term "EGM" is used herein to refer to any suitable electronic gaming machine which enables a player place one or more wagers, play one or more games and/or interact with one or more remote viewers via the live streaming platform, wherein the EGM comprises, but is not limited to: a slot machine, a video poker machine, a video lottery terminal, a terminal associated with an electronic table game, a video keno machine, a video bingo machine, a sports betting terminal, or a kiosk, such as a sports betting kiosk. As such, the system disclosed herein is configured to enable a player at any suitable slot machine, video poker machine, video lottery terminal, terminal associated with an electronic table game, video keno machine, video bingo machine, sports betting terminal or kiosk (as well as players utilizing any suitable personal gaming device) to participate in the live streaming system and reap the benefits (in the form of awards, notoriety and interactions with other players or remote viewers) associated with such participation.

It should be further appreciated that while described herein in certain embodiments as an EGM interacting with the live streaming platform, in certain embodiments, a component of a gaming establishment management system, such as a slot machine interface board, in communication with the EGM interacts with the live streaming platform (and the EGM) to facilitate the live streaming system disclosed herein as well as foster the interaction between a player of the EGM and/or one or more remote viewers. That is, in certain embodiments, the system disclosed herein utilizes a component of a gaming establishment management system, such as a slot machine interface board associated with an EGM, to enable a player to participate in the live streaming system and reap the benefits (in the form of awards, notoriety and interactions with other players or remote viewers) associated with such participation. It should thus be appreciated that any suitable action, function or interaction performed by or otherwise associated with an EGM (in association with the EGM interacting with the live streaming platform as described herein) may additionally or alternatively be performed by or otherwise associated with another component of the gaming system, such as a slot machine interface board or other component of a gaming establishment management system either operating in combination with the EGM or operating independent of the EGM.

In certain embodiments, in association with a player logging into a live streaming platform account of the live streaming platform from an EGM, the system enables the player to enable/disable certain components of the EGM. In certain embodiments, in association with a player logging into a live streaming platform account of the live streaming platform from an EGM, the system enables the player to modify the settings or parameters of certain components of the EGM. In these embodiments, as part of configuring the EGM to operate with the live streaming platform, the system utilizes a live streaming platform user interface (210 of FIG. 2) to enable a player to modify zero, one or more aspects of the EGM as they relate to how the EGM operates with the live streaming platform.

In one such embodiment, the system enables the player to modify the use of one or more display devices of the EGM. For example, the system enables the player to enable or disable one or more display devices of the EGM from displaying the images captured by the EGM which are displayed to the remote viewers. In another example, the system additionally or alternatively enables the player to modify the settings of the display device(s) of the EGM, such as modifying the screen layout of the EGM by selecting an area of the display device to display the live stream displayed to the remote viewers, or modifying whether to utilize a split screen to display the live stream displayed to the remote players.

In another such embodiment, the system enables the player to modify the use of one or more cameras of the EGM. For example, since one or more cameras of the EGM (212 of FIG. 2) may be used to capture data of the player playing the EGM, the system enables the player to enable or disable the camera(s) of the EGM from capturing one or more images of the player playing the EGM. In another example, the system additionally or alternatively enables the player to modify the settings of the camera(s) of the EGM, such as modifying the resolution of the camera, modifying the color settings of the camera (e.g., to capture images in color or black and white), modifying the use of a green screen.

In another such embodiment, the system enables the player to modify the use of one or more sound generating devices, such as speakers, of the EGM. For example, since one or more speakers of the EGM may be used to generate sounds communicated from one or more viewers, such as comments made by one or more viewers, the system enables the player to enable or disable the speaker(s) of the EGM. In another example, the system additionally or alternatively enables the player to modify the settings of the speaker(s) of the EGM, such as modifying the volume of the speakers.

In another such embodiment, the system enables the player to modify the use of one or more sound capture devices, such as microphones, of the EGM. For example, since one or more microphones of the EGM may be used to capture the sounds at the EGM, such as comments made by the player, the system enables the player to enable or disable the microphone(s) of the EGM. In another example, the system additionally or alternatively enables the player to modify the settings of the microphone(s) of the EGM, such as modifying the sensitivity of the microphone(s).

In another embodiment, in addition to or alternatively from modifying the settings of one or more components of the EGM, the system enables a player connect or otherwise pair a peripheral device with the EGM (and/or a component of a gaming establishment management system, such as a slot machine interface board) and utilize the connected peripheral device in association with the capturing of data for live stream. That is, the system of this embodiment enables the player to connect one or more peripherals to the EGM (and/or a component of a gaming establishment management system, such as a slot machine interface board) to further enhance the broadcasting experience.

In one embodiment, the peripheral device includes a mobile device (with or without a camera) wherein the system enables a player to wirelessly connect or otherwise pair the mobile device to the EGM such that the player can interact with their audience of remote viewers using the mobile device. In one such embodiment, the wireless communication link includes a direct pairing such that when the user of the mobile device is currently located at or otherwise engaging with an EGM, a direct pairing or linkage occurs between the mobile device and the EGM (or a component of a gaming establishment management system, such as a slot machine interface board, located inside the EGM) utilizing one or more wireless communication protocols, such as Bluetooth™ signals, Bluetooth™ Low Energy ("BLE") signals, one or more cellular communication standard (e.g., 3G, 4G, LTE) signals, one or more Wi-Fi compatible standard signals and/or one or more short range communication signals, such as near field communication ("NFC") signals protocol). In another such embodiment, the wireless communication link includes an indirect pairing such that when the user of the mobile device is currently located at or otherwise engaging with an EGM and wirelessly connected to one or more servers of a gaming establishment, an indirect pairing or linkage occurs between the mobile device and the EGM (or one or more components of a gaming establishment management system located inside the EGM) via the one or more gaming establishment servers. In another embodiment, in addition to or alternative from using the mobile device as a peripheral device associated with the EGM, the system enables the player to utilizes a paired mobile device (which is running a mobile device application configured to interface with the EGM) to display a live streaming platform user interface such that the player can adjust one or more settings on the EGM which pertain to the live stream.

In another embodiment, the peripheral device includes a headset (including a microphone) wherein the system enables a player to connect or otherwise pair the headset (214 of FIG. 2) to the EGM (and/or a component of a gaming establishment management system, such as a slot machine interface board) such that the player can speak with their audience of remote viewers. In this example, if the headset is a wired headset, the system enables the player to connect to the EGM over USB Audio, standard analog headphone and speaker jacks, or optical inputs and outputs. On the other hand, if the headset is a wireless headset, the system enables the player to connect to the EGM via establishing a wireless communication link with the headset. In these embodiments, if the peripheral device requires a power source, the system further enables the player to power such connected peripheral devices via one or more USB power outlets and/or wireless charging devices.

In certain embodiments, in addition to enabling a player to connect a peripheral device to the EGM, the system adjusts one or more settings of the EGM responsive to the detection of a connected peripheral device. For example, upon the EGM detecting that headphones are connected, the system mutes one or more speakers of the EGM and routes one or more sound outputs to the headphones so that the risk of echo when the player is speaking into their headphone microphone is minimized. In one such example, the system routes all sound outputs to the headphones. In another such example, the system routes certain sound outputs to the headphones but continues routing other sound outputs, such as sounds associated with large jackpots, sounds occurring during certain in-game bonuses, or other sounds that contribute to the general ambiance of the gaming establishment for exciting events, to the speakers of the EGM.

It should be appreciated that while certain adjustments to one or more components of the EGM occur in association with a player logging into a live streaming platform account of the live streaming platform, in certain additional embodiments, one or more adjustments to one or more components of the EGM occur based on the live stream of the player's gaming session. In these embodiments, the EGM displays (either continuously or responsive to one or more inputs made by the player during the player's gaming session) one or more live streaming platform user interfaces which enable the player to change one or more configurations of the EGM that pertain to the broadcasted live stream of the player's gaming session. For example, since one or more display devices of the EGM and/or speakers of the EGM may be utilized to provide the player the live stream which is broadcasted to one or more remote viewers, the system gives the player instant feedback and enables the player to modify one or more settings of any suitable component utilized to produce the live stream, such as a camera of the EGM, a camera paired with the EGM, a microphone of the EGM or a microphone paired with the EGM.

In another embodiment, in addition to or alternatively from adjusting one or more settings of the EGM based on the feedback of the player, the system displays to the player certain information regarding the player's live stream to provide the player at the EGM a more immersive experience to foster more interaction with the remote viewers. For example, the EGM utilizes a player feedback display to display to the player statistics about how many viewers are viewing the player's play online at the current point in time. In another example, the EGM utilizes a player feedback display to inform the player at the EGM of the current live chat associated with the player's gaming session so that they player can respond (using a microphone to provide comments and/or answer requests from viewers). In another example, the EGM utilizes a player feedback display to display non-game play statistics for the play session, such as total gifts given, gifts given to charity, or any award given to the player by viewers. In different embodiments, the system displays none, part or all of the information of this player feedback display to the remote viewers of the live stream.

Following the player logging into the live streaming platform account associated with the player, upon an occurrence of a game triggering event, the EGM displays a play of a game as indicated in block 104. The play of the game includes the determination and display of an outcome and the determination and display of any award associated with the determined outcome.

In various embodiments, the system disclosed herein is configured to enable the play of any suitable game (216 of FIG. 2) occurring at an EGM to be streamed to one or more remote viewers. In certain embodiments, the game comprises a play of a primary game, such as a primary wagering game, wherein the game triggering event includes the placement of a wager on the play of the primary game. In certain embodiments, the game comprises a play of a secondary game, such as a free spin game, wherein the game triggering event occurs based on a displayed event associated with a play of a wagered on primary game. In certain embodiments wherein the game comprises a secondary game, such as a free spin game, the game triggering event occurs based on an event independent of any displayed event associated with the play of the wagered on primary game. In these embodiments, the displayed play of the game includes, but is not limited to: a play of any suitable spinning reels game, a play of any suitable wheel game; a play of any suitable card game such as blackjack, poker or baccarat; a play of any suitable keno game; a play of any suitable bingo game; a play of any suitable offer and acceptance game; a play of any suitable award ladder game; a play of any suitable puzzle-type game; a play of any suitable persistence game; a play of any suitable selection game; a play of any suitable cascading symbols game; a play of any suitable ways to win game; a play of any suitable scatter pay game; a play of any suitable coin-pusher game; a play of any suitable elimination game; a play of any suitable stacked wilds game; a play of any suitable trail game; a play of any suitable bingo game; a play of any suitable video scratch-off game; a play of any suitable pick-until-complete game; a play of any suitable shooting simulation game; a play of any suitable racing game; a play of any suitable promotional game; a play of any suitable high-low game; a play of any suitable lottery game; a play of any suitable number selection game; a play of any suitable dice game; a play of any suitable skill game; a play of any suitable partial skill game; a play of any suitable auction game; a play of any suitable reverse-auction game; a play of any suitable group game; and/or a play of any other game disclosed herein.

In addition to determining and displaying an outcome and an associated award for the play of the game, the EGM captures live stream data associated with play of the game as indicated in block 106. That is, since one or more aspects of one or more plays of a game occurring at the EGM are broadcasted to one or more remote viewers, the system disclosed herein captures certain of the content of such plays of such games, such as one or more frames of one or more display devices of the EGM, to provide to such remote viewers.

In one such embodiment wherein the captured live stream data includes one or more frames of one or more display devices of the EGM, the system captures such frames directly from a frame buffer associated with the display device of the EGM. In another such embodiment wherein the captured live stream data includes one or more frames of one or more display devices of the EGM, the capturing of one or more frames includes utilizing one or more programs which are operable to capture the frames. For example, the system captures live stream data of the EGM by utilizing a program that runs on the EGM that is responsible for discovering which area or window of which display device is associated with a currently active game, obtaining from an operating system of the EGM a context for that window, and periodically gathering the contents of that window, such as sixty times a second. In another example, the system captures live stream data of the EGM by utilizing a program that runs on a component of a gaming establishment management system, such as a slot machine interface board associated with the EGM (and in certain embodiments, in association with a video capture device, such as a picture-in-picture device) and that is responsible for discovering which area or window of which display device of the EGM is associated with a currently active game, obtaining from an operating system of the EGM a context for that window, and periodically gathering the contents of that window, such as sixty times a second. In these examples, the programs being run will take each frame gathered and run a video compression algorithm on the captured data and send the compressed data to the live streaming platform using an identifier associated with the player and their current stream.

In one such embodiment, the system captures the content displayed by one or more display devices of the EGM to broadcast to the remote viewers (with the possible addition of supplemental content as described below). In this embodiment, as seen in FIG. 1B, following the occurrence of a capture frame triggering event as indicated in block 120, the system connects to a display device of an EGM (or personal gaming device) and captures a frame to a memory buffer as indicated in blocks 122 and 124. In this example, following the capture of the frame, the system determines if enough frames have been captured to encode as the stream of content occurring at the EGM (or personal gaming device) as indicated in diamond 126. If enough fames have not been captured, the system returns to block 124 and captures the next frame as described above. On the other hand, if enough frames have been captured, the system encodes the buffered frames using a suitable video compression algorithm as indicated in block 128. Following the encoding of the buffered frames, as indicated in block 130, the system uploads the next frames of content in the compressed stream (subject to any modifications) to the live streaming platform server and returns to block 124 to capture the next frame.

In another such embodiment, the system captures certain areas or windows of one or more display devices of the EGM to broadcast to the remote viewers. In this embodiment, rather than displaying to the remote viewers all the content which the player at the EGM sees (which may include external controlled interface (i.e., service window) content personal to the player or other sensitive content not intended to be broadcasted), the system captures certain content, such as a game play content, and does not capture certain other content. For example, if an EGM is currently displaying a live video stream associated with a sporting event in a window of a display device of the EGM and the live streaming platform lacks the content licenses to also display the live video stream of the sporting event, the system excludes the live video stream of the sporting event from the content captured. In this embodiment, as seen in FIG. 1C, following the occurrence of a capture frame triggering event as indicated in block 140, the system determines if any change occurred in an active window associated with the live stream as indicated in diamond 142. If a change occurred in the active window associated with the live stream, the system connects to a display device of an EGM (or personal gaming device) as indicated in block 144. Following this connection or otherwise if the system determined that no change occurred in the active window associated with the live stream, the system captures a frame of the active window to a memory buffer as indicated in block 146. In this example, following the capture of the frame, the system determines if enough frames have been captured to encode as the stream of content occurring at the EGM (or personal gaming device) as indicated in diamond 148. If enough fames have not been captured, the system returns to block 142 and again determines if any change occurred in the active window associated with the live stream as described above. On the other hand, if enough frames have been captured, the system encodes the buffered frames using a suitable video compression algorithm as indicated in block 150. Following the encoding of the buffered frames, as indicated in block 152, the system uploads the next frames of content in the compressed stream (subject to any modifications) to the live streaming platform server and returns to block 142 to again determine if any change occurred in the active window associated with the live stream.

Returning to FIG. 1A, following the capture of live stream data associated with the play of the game, the system determines whether a captured data modification event has occurred as indicated in diamond 108. That is, after obtaining the data associated with the content generated by the EGM which forms at least part of the live stream and prior to enabling any remote viewers access to that particular captured data of the live stream, the system determines whether to one or more events have occurred to augment such content by changing part of the content, removing part of the content and/or adding to the content.

If the system determines that a captured data modification event occurred, the system modifies the live stream data captured from the EGM as indicated in diamond 110. In other words, upon an occurrence of a modification event and prior to enabling any remote viewers access to that particular captured data of the live stream, the system modifies or otherwise alters the data captured from the EGM to supplement the live stream with additional information. In various embodiments, supplemental content derived from this additional information is added to the live stream by overlaying the supplemental content onto a captured frame of a display device of the EGM and/or separately displaying the supplemental content along with a captured frame of a display device of the EGM such that the live stream includes audio-visual content of the player's gaming session as well as the additional information.

In one embodiment, the additional information utilized to form the supplemental content added to the live stream includes one or more of: still images (e.g., a photograph of a player's reaction during a play of a game), video clips (e.g., a video of a player's reaction to a play of a game), sound clips (e.g., a player's verbal reaction to a play of a game), augmented still images (e.g., an augmented photograph of a player's reaction during a play of the game, such as the player' reaction modified via one or more filters or superimposed with an outcome of a play of the game), augmented video clips (e.g., an augmented video recording of a player's reaction to a play of a game), augmented sound clips (e.g., a player's augmented verbal reaction to a play of a game), audio-video clips, text, non-wagering transaction information associated with the player (e.g., an amount spent purchasing goods at a gaming establishment's luxury clothing store), location information, application usage information, event attendance information, and/or biometric information. In certain embodiments, the system informs the player of the publication of this additional information. In certain of such embodiments, the system enables the player to opt-out of (or alternatively opt-into) this feature as well as enables the player to configure notifications of when such additional information is to be published.

In another embodiment, the additional information utilized to form the supplemental content added to the live stream includes details about the player's current (or historical) gaming session, such as, but not limited to, a largest award amount won in the gaming session, a duration of the gaming session, an average amount wagered for the gaming session, a total amount wagered for the gaming session, a total amount won for the gaming session, an average amount won for the gaming session, and/or any jackpots won for the gaming session.

In another embodiment, the additional information utilized to form the supplemental content added to the live stream includes details about one or more tournaments the player is currently participating in (or historically participated in). In this embodiment, multiple players participate in a gaming establishment tournament where players compete to determine who will win the tournament and one or more players in the tournament stream their play live using the live streaming platform disclosed herein. In such a configuration, the live streaming platform is linked to the system running the tournament and tracking the score of the EGMs that are participating wherein the live streaming platform uses the data published by the tournament system, such as a tournament manager server 218 of FIG. 2, to display additional information regarding the tournaments 220, such as, but not limited to, a current leaderboard of the tournament, a current standing in the tournament (i.e., the player's current position on the leaderboard of the tournament), a largest award amount won in the tournament, a duration of the tournament, an average amount wagered in the tournament, a total amount wagered in the tournament, a total amount won in the tournament, an average amount won in the tournament, and/or any jackpots won in the tournament.

In another embodiment, the additional information utilized to form the supplemental content added to the live stream includes details about any achievements earned or otherwise associated with the player and/or the player' current (or historical) gaming session. In this embodiment, the system utilizes game outcome data published by the EGM to the live streaming platform to associate the player with one or more achievements such as badges, avatars, access to one or more emojis, awards (in the form of monetary credits, non-monetary credits, physical goods, and/or any award disclosed herein), wherein the system causes information about such achievements (222 of FIG. 2) to be overlaid onto or displayed along with the captured frames. In different embodiments, such achievements are earned or otherwise associated with the player based on the historical play statistics of the player and/or the historical play statistics of the player relative to the historical play statistics of one or more other players (to determine how each player has relatively performed during one or more gaming sessions). It should be appreciated that while such achievements may be based on game outcome data of a wager amount and any awards, game outcome data may additionally be based on any trackable event occurring in association with a play of a game (e.g., for a play of poker game, the game outcome data includes the hand of playing cards initially dealt, the playing cards held by the player, the final hand of playing cards and any associated award), or occurring independent of any play of any game but otherwise associated with the player's gaming session.

In another embodiment, the additional information utilized to form the supplemental content added to the live stream includes details about a quantity of viewers currently viewing the player's gaming session. In another such embodiment, the additional information includes historical details about a quantity of historical viewers whom has viewed the player's historic gaming sessions. In another embodiment, the additional information utilized to form the supplemental content added to the live stream includes details about a quantity of views of the player's gaming session. In another such embodiment, the additional information includes historical details about a quantity of historical views of the player's historic gaming sessions. In another embodiment, the additional information utilized to form the supplemental content added to the live stream includes details about a quantity of viewers following the player (i.e., a number of followers of the player). In another embodiment, the additional information utilized to form the supplemental content added to the live stream includes details about a quantity of subscribers associated with the player.

In another embodiment, the additional information utilized to form the supplemental content added to the live stream includes details about any gifts or awards sent to the player by one or more viewers. In this embodiment, remote viewers can send monetary gifts to players as a virtual "thank you" for playing well, or performing some action requested by a viewer, wherein the system displays such gifts (either individually or collectively) such that the remote viewers see the live stream of the player's gaming session as well as information regarding such gifts. For example, a remote viewer congratulates the player for earning a royal flush in a poker game by gifting them $20. In another example, a remote viewer requests, through an online chat, that the player hold certain cards in a poker hand by gifting the player some amount of money. In another embodiment, one or more gifts given to players participating in the tournament by remote viewers impact a player's position in an ongoing tournament. For example, if a player has a credit meter balance of $1000 after one minute of play, and they're currently ranked 3$^{rd}$ on the leaderboard, and an online viewer gifts that player $200, then the player may jump into 1$^{st}$ place on the leaderboard.

It should be appreciated that these gifts are funded by electronic credits that viewers establish with the live streaming platform. That is, the system disclosed herein utilizes accounts associated with remote viewers 224 (that are maintained by the live streaming platform) to transfer funds to one or more digital accounts or electronic wallets, such as gaming establishment accounts 226 (and/or gaming establishment components, such as EGMs) associated with a gaming establishment. In different embodiments, such funds are transferred from an account associated with the remote viewer to an account associated with the player, from an account associated with the remote viewer to a cashless wagering account maintained for the player by a cashless wagering system of a gaming establishment, and/or from an account associated with the remote viewer to a credit balance of the EGM (wherein such transfers are recorded using existing wagering account transfer or bonus meters tracked by an EGM, or view additional meters added to track such transfers). In another embodiment, such funds are transferred from an account associated with a remote viewer to the EGM wherein rather than such funds directly modifying a credit balance of the EGM, such funds contribute to one or more game outcomes determined by the EGM (e.g., a gift of $20 from a remote viewer is provided to the player at the EGM as an award of $20 associated with a game outcome determined in association with a play of a game). It should be appreciated that any suitable digital wallet which maintains or is otherwise associated with an amount of funds for a player at an EGM and/or a remote viewer may be utilized in association with the present application.

In another embodiment, the additional information utilized to form the supplemental content added to the live stream includes details about any gifts provided to any charities associated with the player by one or more viewers. In this embodiment, remote viewers can send monetary gifts to a charity of the player's choosing as a virtual "thank you" for playing well, or performing some action requested by a viewer, wherein the system displays such charitable gifts (either individually or collectively) such that the remote viewers see the live stream of the player's gaming session as well as information regarding such gifts. For example, a remote viewer congratulates the player for playing for a certain amount of time by providing a gift of $100 to a charity designated by the player. It should be appreciated that the charitable gift given by a viewer is funded by transferring money from an account that viewer established with the live streaming platform to one or more financial institution accounts associated with the charity and maintained by one or more financial institutions.

Figure 3:
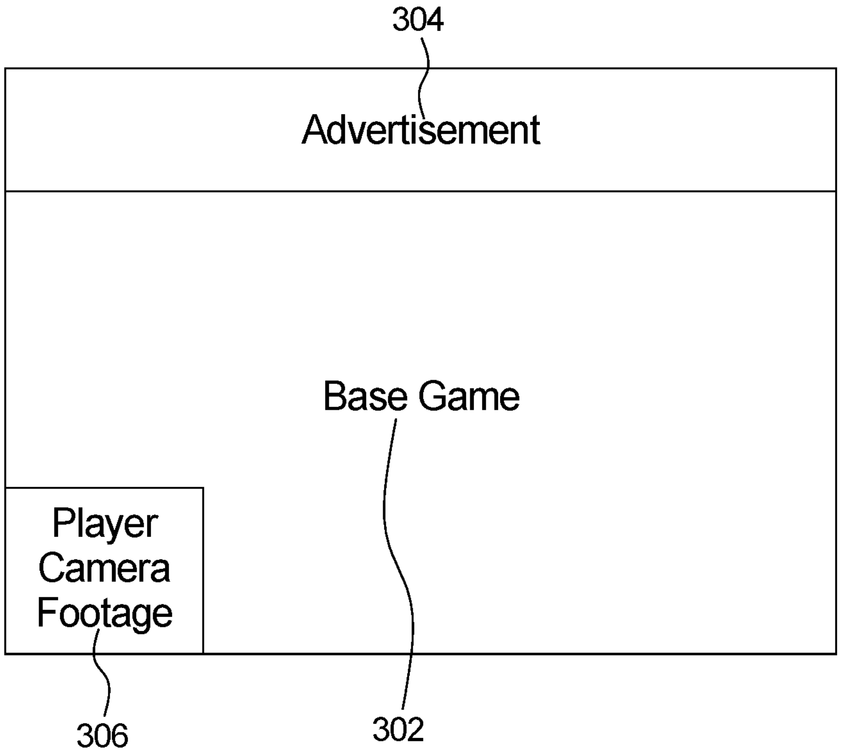
FIG. 3 is an example graphical user interface displayed to a remote viewer in association with a live stream of a gaming session occurring at an electronic gaming machine.

In another embodiment, the additional information utilized to form the supplemental content added to the live stream includes advertising data associated with a gaming establishment wherein the EGM is located and/or a third party. In one embodiment, the EGM broadcasting the player's video stream may encode an advertisement 228 for the gaming establishment in the video. For example, as seen in FIG. 3, the base game 302 may be surrounded by a logo or advertisement 304, such as an advertisement of the gaming establishment that the player is at. In another example, the gaming establishment advertisement includes an embedded audio/video clip, such as footage of the player at the EGM 306 or a promotional audio/video clip of a concert attended by the player at a gaming establishment, along with attendance information regarding a player attending the concert, the gaming establishment where the concert occurred and advertising text describing upcoming dates for the concert. In these embodiments, the gaming establishment advertisement (and/or third party advertisement associated with the live stream) offers the remote viewers different benefits, such as awards, discounts, free points, free promotional credits at the gaming establishment for signing up for a visit to the gaming establishment, for viewing the live stream or associating the remote viewer's player tracking account with their remote viewer account. In different embodiments, different levels of activity by the remote viewers are associated with different benefits, wherein the benefit provided to the remote viewer is based on how much they watch, how many gifts they give players, or how many bets they place. In these embodiments, such benefits are funded by a gaming establishment if the gaming establishment that is hosting the player gets a percentage of the subscriptions to a player's channel, gifts, and/or bets (or a percentage of the hold associated with such bets).

In another embodiment, the additional information utilized to form the supplemental content added to the live stream includes details about an additional wager placed by the player at the EGM. In one such embodiment, the EGM enables players to place wagers on sporting events while at the EGM, wherein the information regarding such sports wagers are broadcast as part of their live stream. In this embodiment, as the events associated with a sports wager made occur or finalize, the results of the sports wager are reported to the live streaming platform by the EGM (or the sports betting system which maintains and tracks such wagers). Such reporting enables the live streaming platform to update the appropriate player statistics and possibly award the player any achievements as described above.

In certain embodiments, in addition to or alternatively from modifying the live stream data captured from the EGM with additional information, the modification of the live stream data includes removing certain of the captured live stream data or otherwise altering the captured live stream data. In these embodiments, rather than displaying to the remote viewers all the content which the player at the EGM sees (which may include external controlled interface (i.e., service window) content personal to the player or other sensitive content not intended to be broadcasted), the system obscures certain content prior to being broadcasted to any remote viewers. For example, if an EGM is currently displaying a live video stream associated with a sporting event in a window of a display device of the EGM and the live streaming platform lacks the content licenses to also display the live video stream of the sporting event, the system blacks out, grays out or otherwise masks the live video stream of the sporting event from being displayed to remote viewers.

Figure 2:
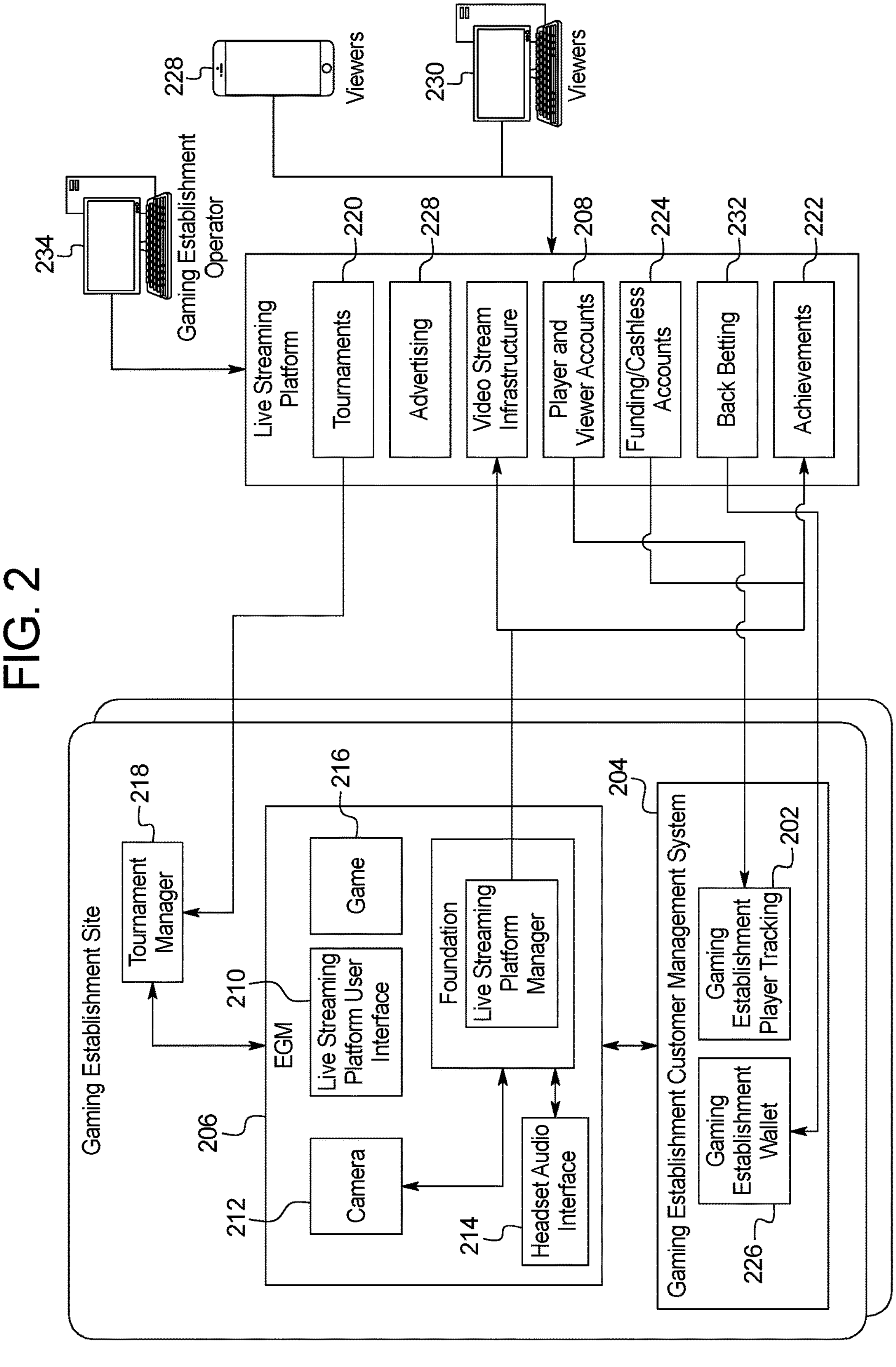
FIG. 2 is an example configuration of the architecture of a plurality of different components of the system disclosed herein

Following the modification of the data captured from the EGM or if the system determines that a captured data modification event did not occur, the system uploads the live stream data to the live streaming platform as indicated in block 112 of FIG. 1A. Following this upload, the live streaming platform enables one or more remote viewers to access the live stream data to receive the live stream from a device remote from the EGM as indicated in block 114. For example, as seen in FIG. 2, the live streaming platform enables different remote viewers on different remote devices 228 and 230 to each access the live stream of events occurring at an EGM at a gaming establishment.

In certain embodiments, the live streaming platform enables any remote viewer to access any live stream associated with any EGM. In certain embodiments, the live streaming platform restricts certain remote viewers from accessing certain live streams associated with certain EGMs. In certain embodiments, the system restricts access to certain live streams based on one or more of an age of the remote viewer, a location of the remote viewer, an age of the player, a location of the player, any regulations pertaining to the age and/or location of the remote viewer, and/or any regulations pertaining to the age and/or location of the player.

In certain embodiments which impose one or more restrictions on remote viewers, the system enables a remote viewer to pay a fee (e.g., a daily fee, weekly fee, monthly fee or yearly fee) to view one or more live streams and/or participate in one or more live chats. In one such embodiment, if the system requires a remote viewer to pay to fully participate in the live stream, then in addition to any percentage of the fees allocated to the operator of the live streaming platform (234 of FIG. 2), the system allocates a percentage of the fee to the player at the EGM associated with the live stream. In another such embodiment, if the system requires a remote viewer to pay to fully participate in the live stream, then in addition to any percentage of the fees allocated to the operator of the live streaming platform, the system additionally or alternatively allocates a percentage of the fee to the gaming establishment where the EGM associated with the live stream is at. In this embodiment, if the live streams associated with a player occurred via the player playing multiple EGMs at multiple gaming establishments, the system splits the fees amongst the multiple gaming establishments based on any suitable fee splitting arrangement, such as based on hours played at each EGM and/or coin-in at each EGM.

In certain embodiments, the live streaming platform enables one or more remote viewers to access the live stream without further interactions. In these embodiments, the live streaming platform enables the remote viewer to passively observe the events occurring at the EGM. In certain embodiments, the live streaming platform enables one or more remote viewers to access the live stream and further interact with the player at the EGM. In these embodiments, upon an occurrence of a remote viewer interaction event, the live streaming platform enables the remote viewer to not only observe the events occurring at the EGM but additionally interact with the player at the EGM, such as by providing gifts to the player at the EGM and/or participating in a conversation with the player at the EGM. In certain embodiments, the live streaming platform enables one or more remote viewers to access the live stream and further interact with the live streaming platform to access certain wagering features. In these embodiments, upon an occurrence of a remote viewer interaction event, the live streaming platform enables the remote viewer to not only observe the events occurring at the EGM but additionally interact with the live streaming platform to place one or more wagers on one or more events occurring at the EGM which are part of the live stream.

In one embodiment wherein the remote viewer actively interacts with the live stream, following the remote viewer establishing and adequately funding a live streaming wagering account (224 of FIG. 2) and accessing a live stream associated with a gaming session at an EGM, the live streaming platform enables the remote viewer to place a back bet (232 of FIG. 2) on a play of a game (or other event occurring at the EGM which a wager may be placed on by the player) based on the bet placed by the player at the EGM. In this embodiment, if the player at the EGM does not win any award based on the placed wager, then the remote viewer also loses the back bet. On the other hand, if the player at the EGM wins an award (having a value greater than zero) based on the placed wager, then any remote viewer who was back betting along with the player at the EGM will win the same amount. In one such embodiment, the system provides the entire win amount of the remote viewer to the remote viewer (to place another back bet or transfer to the live streaming wagering account). In another such embodiment, the system provides or otherwise automatically gifts a portion of the win amount of the remote viewer to the player at the EGM.

In another embodiment wherein the remote viewer actively interacts with the live stream, following the remote viewer establishing and adequately funding a live streaming wagering account and accessing a live stream associated with a gaming session at an EGM, the live streaming platform enables the remote viewer to place a bet against one or more other remote viewers (and/or one or more players at one or more EGMs). For example, the system enables a remote viewer to place a bet on which player will win an ongoing tournament. In this embodiment, if the wagered on player does not win the ongoing tournament, then the remote viewer loses their wager. On the other hand, if the wagered on player wins the ongoing tournament, then the system provides the remote viewer an award based on the lost wagers placed by one or more other remote viewer (and/or one or more players at one or more EGMs) minus a percentage held by the system.

In certain embodiments, the awards available to be won by one or more remote viewers in association with one or more wagers placed by such remote viewers and/or the gifts available to be provided by such remote viewers to players at EGMs include, but are not limited to, one or more of: a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free dinner, a free night's stay at a hotel, a high value product such as a free car, or a low value product, one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), virtual goods associated with the gaming system, virtual goods not associated with the gaming system, an access code usable to unlock content on an internet.

It should be appreciated that in certain embodiments which enables one or more remote viewers to interact with one or more live streams (e.g., via live chatting with a player at the EGM generating at least part of the live stream and/or via wagering on one or more events associated with the EGM generating at least part of the live stream), the live streaming platform accounts for this interaction in determining any additional information to display as part of the live stream. For example, the additional information incorporated as part of a live stream includes data associated with one or more bets placed in association with a player at an EGM, such as the amount won by remote viewers for back betting on a player at an EGM or the win and loss records for back betting sports wagers placed by viewers in association with a player at an EGM. In such embodiments wherein one or more remote viewers interact with the live stream, since the EGM is the entity that encodes the video stream, any activities or event occurring on the live streaming platform must be sent to the EGM to update any graphical elements rendered in the video stream. For example, if a remote viewer sends a gift to a player at the EGM, then the live streaming platform generates an award message. In this example, either the live streaming platform sends the generated message to the EGM, or the EGM actively polls the live streaming platform for any outstanding notification messages. Upon receipt of a notification message, the EGM acts upon the notification, such as displaying a notification that only the player at the EGM can see, rendering of one or more notifications onto the game itself, and/or rendering of one or more notifications as part of the video stream (which are viewable by remote viewers and may or may not be seen by the player at the EGM).

It should be further appreciated that while described herein as a live stream being generated from an EGM, in alternative embodiments, the system disclosed herein enables a live stream to be generated based on the wagering activity occurring at a player's personal gaming device. In these embodiments, the online gaming system running the player's online game (which the player uses a personal gaming device to interact with) will be responsible for publishing game outcome information to the live streaming platform. In these embodiments, any gifts from viewers will be transferred to the player's online cashless gaming account directly rather than be transferred to the credit balance of an EGM or a gaming establishment cashless wagering account.

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

Thus, in various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the data network is a WAN, the gaming system includes a central server, central controller, or remote host and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server".

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 4:
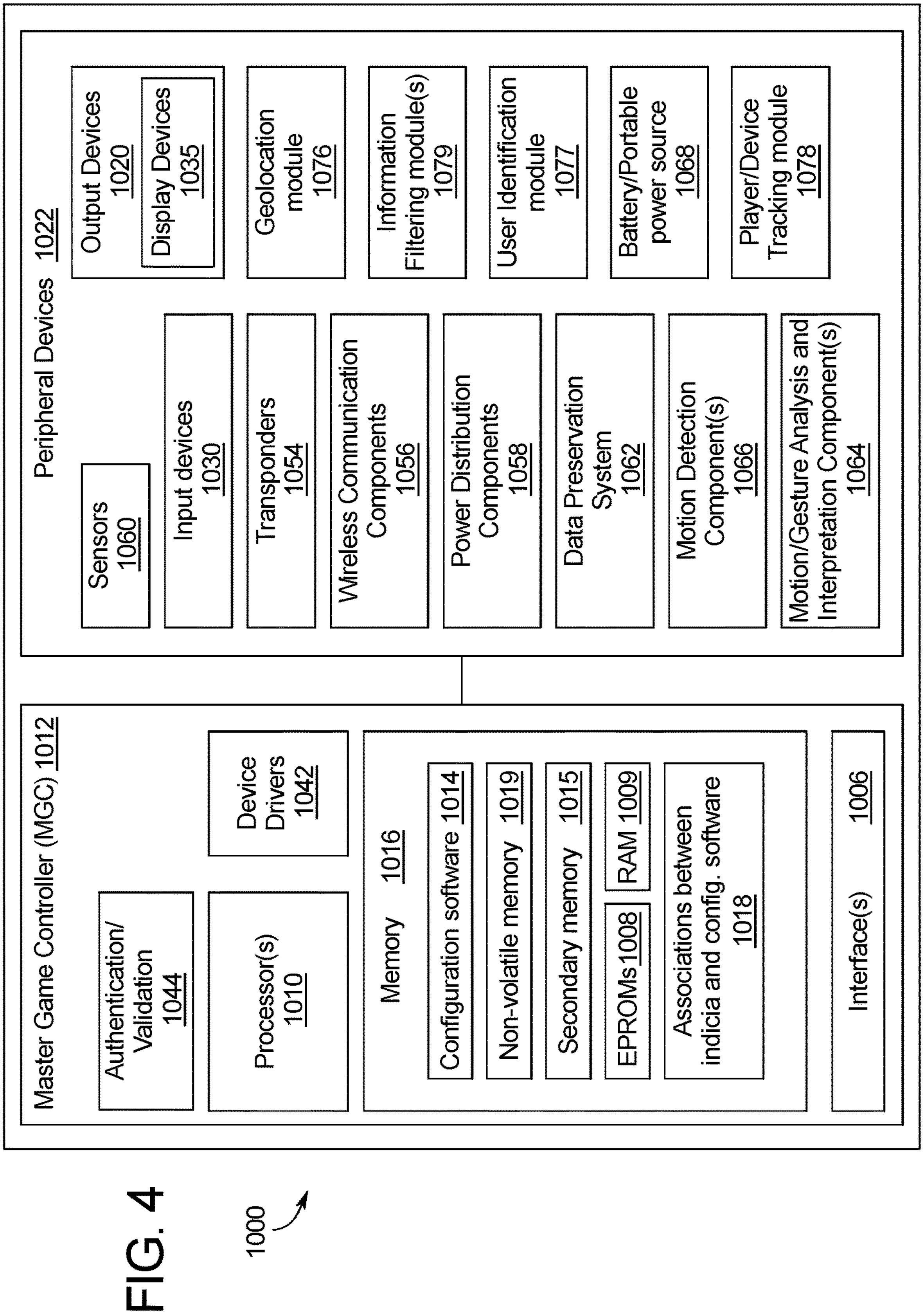
FIG. 4 is a schematic block diagram of one embodiment of an electronic configuration of an example electronic gaming machine disclosed herein.
Figure 5A:
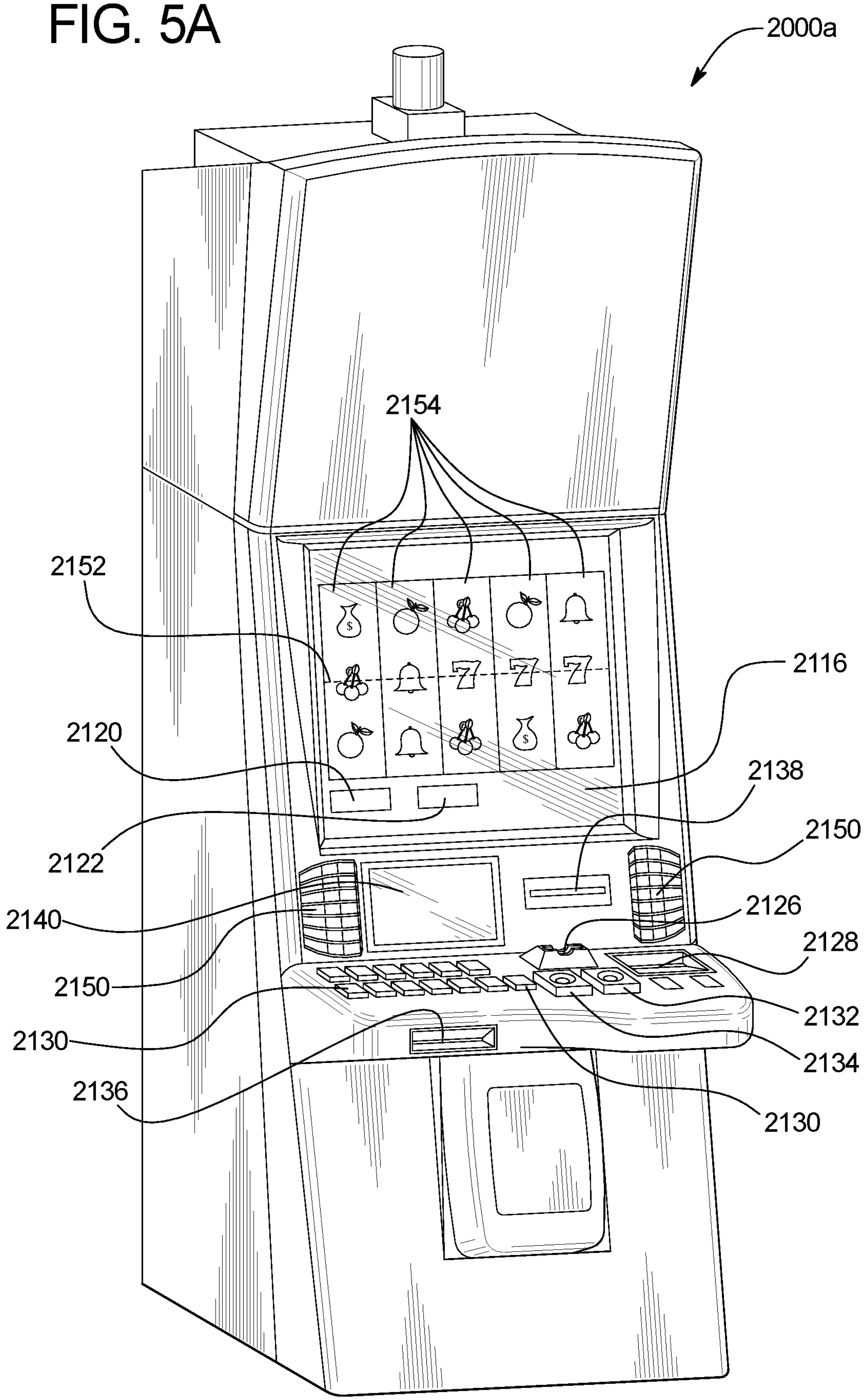
FIGS. 5A and 5B are perspective views of example alternative embodiments of the electronic gaming machine disclosed herein.
Figure 5B:
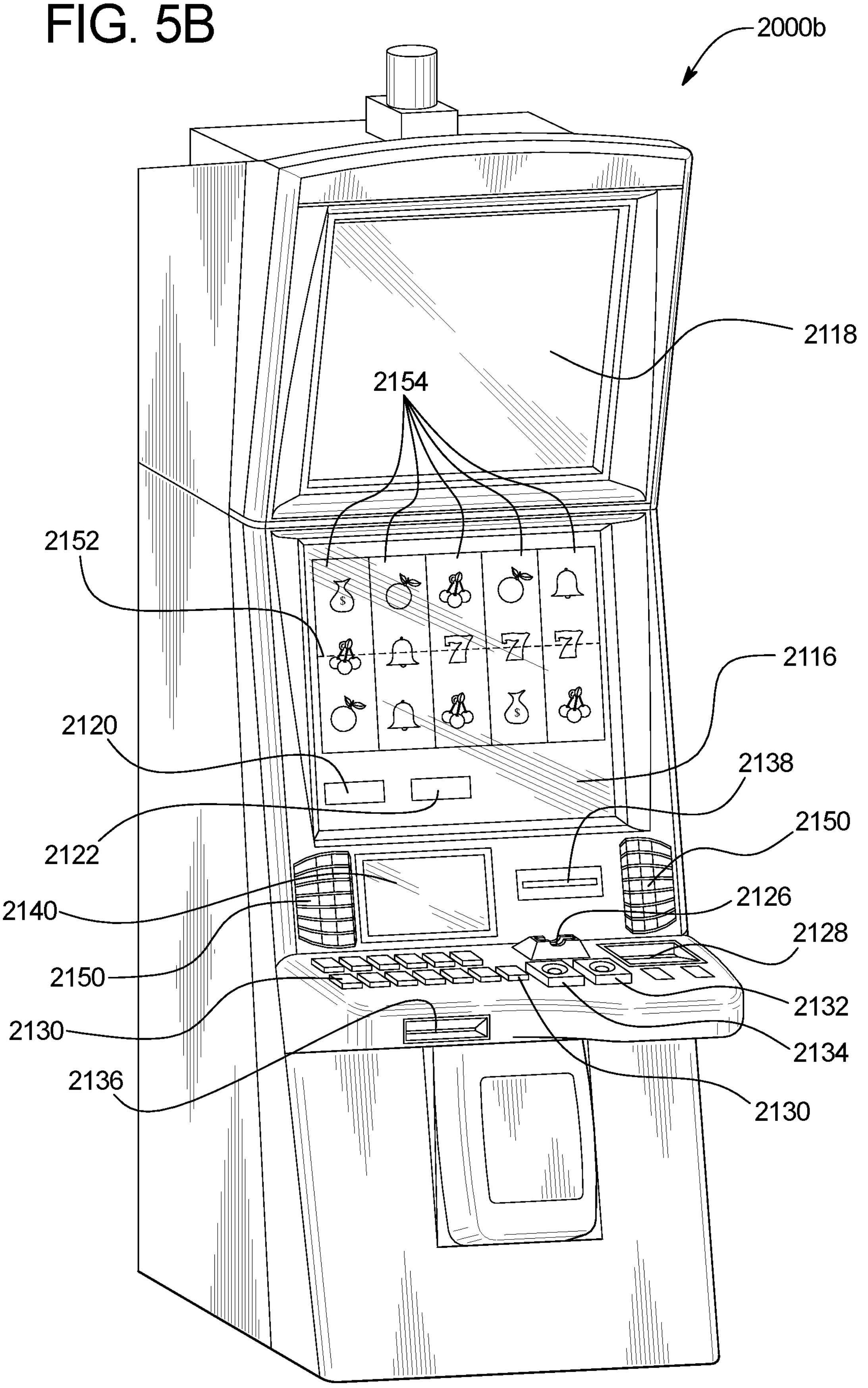
Figure 5C:
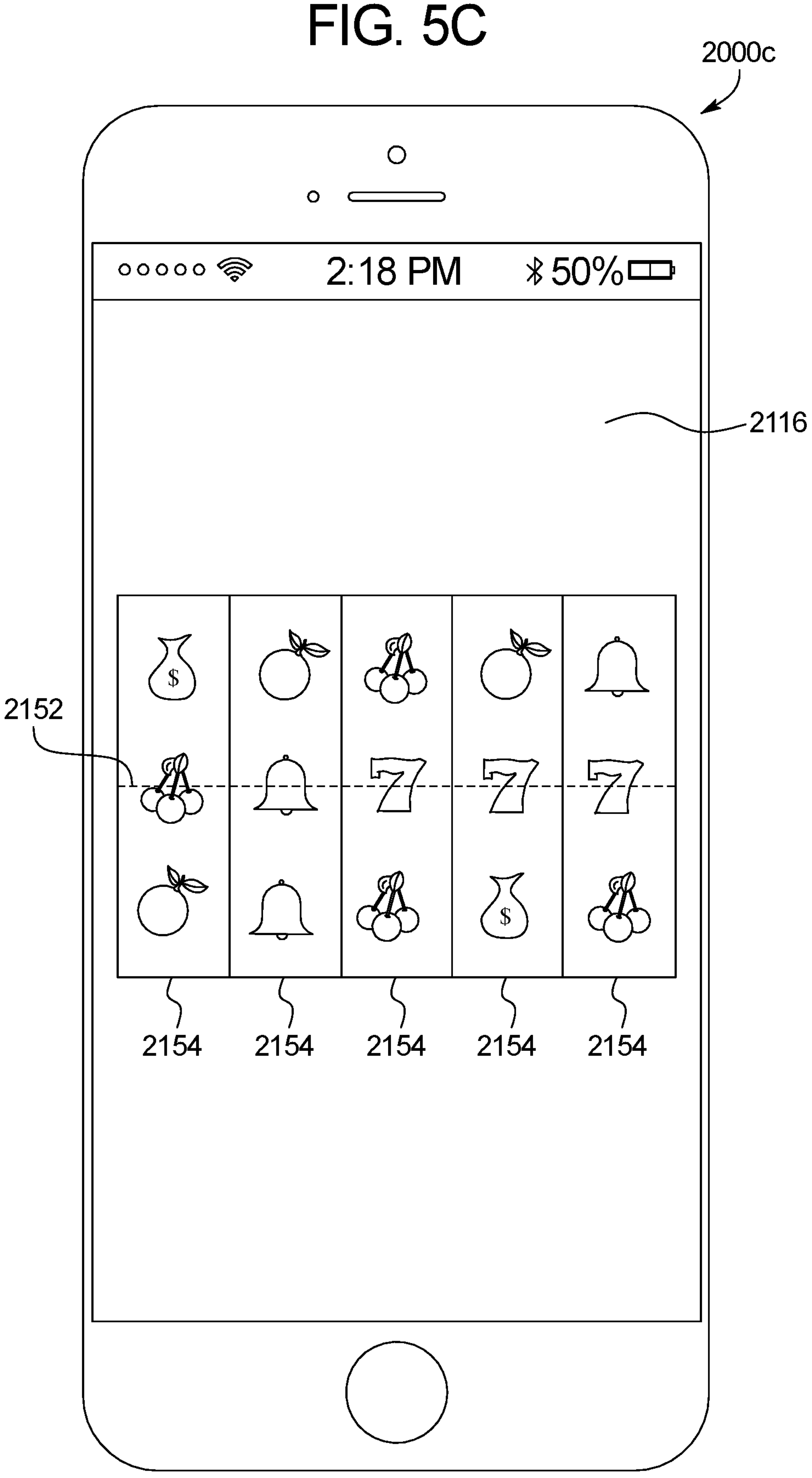
FIG. 5C is a front view of an example personal gaming device of the system disclosed herein.

FIG. 4 is a block diagram of an example EGM 1000 and FIGS. 5A and 5B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 5C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620,047, entitled "Electronic Gaming Apparatus Having Authentication Data Sets".

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 5A includes a central display device 2116, a player tracking display 2140, a credit display 2120, and a bet display 2122. The example EGM 2000*b* illustrated in FIG. 5B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 5A and 5B each include a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; and U.S. Pat. No. 6,048,269, entitled "Coinless Slot Machine System and Method".

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine".

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 5A and 5B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 5A and 5B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Pat. No. 9,039,523, entitled "Avatar as Security Measure for Mobile Device Use with Electronic Gaming Machine". When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 5A and 5B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 5A and 5B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 5A and 5B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 5A and 5B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000*a* and 2000*b* illustrated in FIGS. 5A and 5B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 5A and 5B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game".

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern".

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services".

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM 2000*b* shown in FIG. 5B includes a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations".

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards".

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game (s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win".

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services".

Web-Based Gaming

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination (or in any other manners described above.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer or by initiating creation of a paper check that is mailed to the player.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area. Examples of tethering an EGM to a personal gaming device and geo-fencing are described in U.S. Patent Appl. Pub. No. 2013/0267324, entitled "Remote Gaming Method Allowing Temporary Inactivation Without Terminating Playing Session Due to Game Inactivity".

Social Network Integration

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Differentiating Certain Gaming Systems from General Purpose Computing Devices Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201, 662, entitled "Method and Apparatus for Software Authentication"; and U.S. Pat. No. 8,627,097, entitled "System and Method Enabling Parallel Processing of Hash Functions Using Authentication Checkpoint Hashes".

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play".

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification".

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment".

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System".

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A streaming platform server comprising:
a processor; and
a memory device that stores a plurality of instructions that, when executed by the processor, cause the processor to:
receive, from an electronic gaming machine, data associated with a wagering gaming session occurring at the electronic gaming machine,
determine a stream based on the received data from the electronic gaming machine and supplemental content associated with a user of the electronic gaming machine,
broadcast the determined stream to a plurality of devices remote from the electronic gaming machine, and
responsive to an occurrence of a remote viewer interaction event occurring in association with a remote viewer of a device of the plurality of devices being broadcast the stream, cause a transfer of at least part of an amount of funds maintained in a streaming platform account associated with the remote viewer to an account associated with the user of the electronic gaming machine.

2. The streaming platform server of claim 1, wherein the account associated with the user of the electronic gaming machine comprises a gaming establishment cashless wagering account.

3. The streaming platform server of claim 1, wherein the memory device stores a plurality of further instructions that, when executed by the processor responsive to the occurrence of the remote viewer interaction event, cause the processor to modify the stream being broadcast based on the transfer.

4. The streaming platform server of claim 1, wherein the memory device stores a plurality of further instructions that, when executed by the processor responsive to the occurrence of the remote viewer interaction event, cause the processor to enable the remote viewer to communicate with the user of the electronic gaming machine.

5. The streaming platform server of claim 1, wherein the remote viewer interaction event is associated with an amount wagered by the remote viewer on a play of a game of the wagering gaming session.

6. The streaming platform server of claim 1, wherein the supplemental content associated with the user of the electronic gaming machine excludes content personal to the user of the electronic gaming machine displayed by a display device of the electronic gaming machine.

7. The streaming platform server of claim 1, wherein the memory device stores a plurality of further instructions that, when executed by the processor, cause the processor to enable the user of the electronic gaming machine to modify the stream.

8. A streaming platform server comprising:
a processor; and
a memory device that stores a plurality of instructions that, when executed by the processor, cause the processor to:
receive, from an electronic gaming machine, data associated with a wagering gaming session occurring at the electronic gaming machine,
determine a stream based on the received data from the electronic gaming machine and supplemental content associated with a user of the electronic gaming machine,
broadcast the determined stream to a plurality of devices remote from the electronic gaming machine, and
responsive to an occurrence of a remote viewer interaction event occurring in association with a remote viewer of a device of the plurality of devices being broadcast the stream, cause a transfer of at least part of an amount of funds maintained in a streaming platform account associated with the remote viewer to a credit balance of the electronic gaming machine.

9. The streaming platform server of claim 8, wherein the memory device stores a plurality of further instructions that, when executed by the processor responsive to the occurrence of the remote viewer interaction event, cause the processor to modify the stream being broadcast based on the transfer.

10. The streaming platform server of claim 8, wherein the memory device stores a plurality of further instructions that, when executed by the processor responsive to the occurrence of the remote viewer interaction event, cause the processor to enable the remote viewer to communicate with the user of the electronic gaming machine.

11. The streaming platform server of claim 8, wherein the remote viewer interaction event is associated with an amount wagered by the remote viewer on a play of a game of the wagering gaming session.

12. The streaming platform server of claim 8, wherein the supplemental content associated with the user of the electronic gaming machine excludes content personal to the user of the electronic gaming machine displayed by a display device of the electronic gaming machine.

13. The streaming platform server of claim 8, wherein the memory device stores a plurality of further instructions that, when executed by the processor, cause the processor to enable the user of the electronic gaming machine to make an input to modify the stream.

14. A streaming platform server comprising:

a processor; and a memory device that stores a plurality of instructions that, when executed by the processor, cause the processor to:

receive, from an electronic gaming machine, data associated with a wagering gaming session occurring at the electronic gaming machine, determine a stream based on the received data from the electronic gaming machine, broadcast the determined stream to a plurality of devices remote from the electronic gaming machine, and following a remote viewer of one of the plurality of devices funding a streaming platform account maintained by the streaming platform server for that remote viewer and responsive to an occurrence of a remote viewer wagering event associated with that remote viewer, modify a balance of the streaming platform account associated with that remote viewer.

15. The streaming platform server of claim 14, wherein the memory device stores a plurality of further instructions that, when executed by the processor responsive to the occurrence of the remote viewer wagering event, cause the processor to modify the stream being broadcast.

16. The streaming platform server of claim 14, wherein the memory device stores a plurality of further instructions that, when executed by the processor responsive to the occurrence of the remote viewer wagering event, cause the processor to enable the remote viewer to communicate with a user of the electronic gaming machine.

17. The streaming platform server of claim 14, wherein the remote viewer wagering event is associated with an amount wagered by the remote viewer on a play of a game of the wagering gaming session.

18. The streaming platform server of claim 14, wherein the data received from the electronic gaming machine is associated with supplemental content of a user of the electronic gaming machine.

19. The streaming platform server of claim 18, wherein the supplemental content associated with the user of the electronic gaming machine excludes content personal to the user of the electronic gaming machine displayed by a display device of the electronic gaming machine.

20. The streaming platform server of claim 14, wherein the memory device stores a plurality of further instructions that, when executed by the processor, cause the processor to enable a user of the electronic gaming machine to make an input to modify the stream.

* * * * *